No. 668,434.
Patented Feb. 19, 1901.
T. B. BENEDICT.
PLATFORM WAGON.
(Application filed Nov. 1, 1900.)
(No Model.)
2 Sheets—Sheet 1.
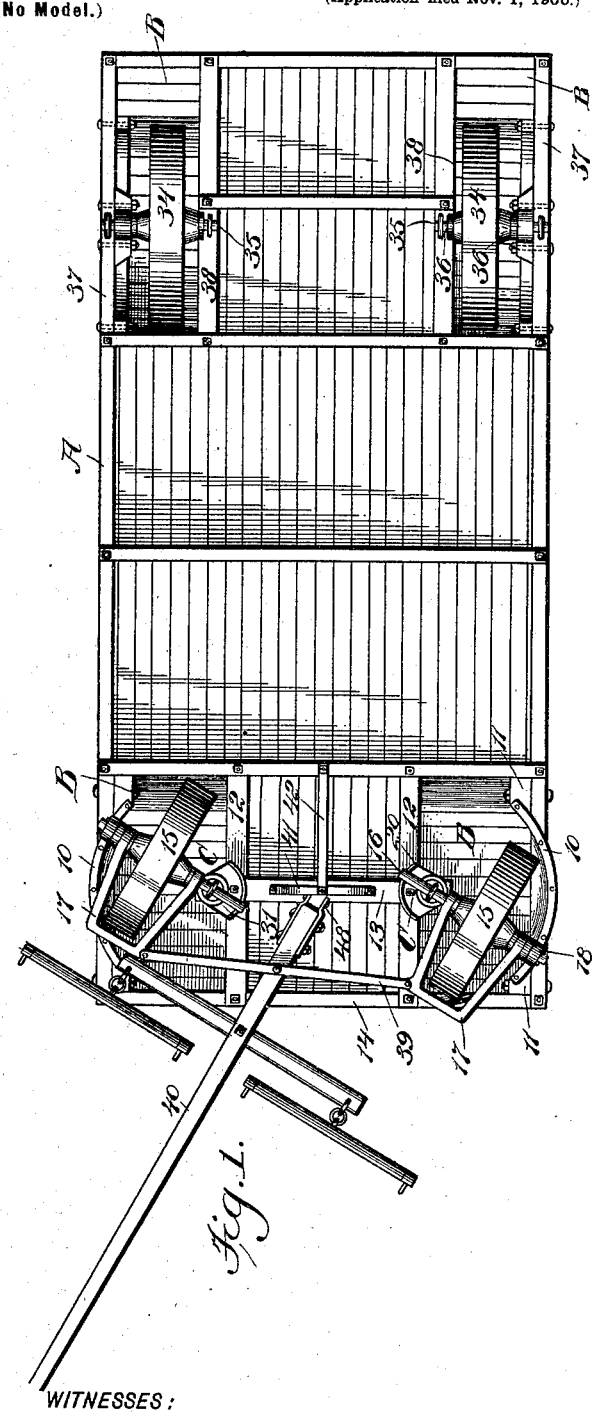
WITNESSES:
INVENTOR
Timothy B. Benedict
BY
ATTORNEYS No. 668,434. Patented Feb. 19, 1901.
T. B. BENEDICT.
PLATFORM WAGON.
(Application filed Nov. 1, 1900.)
(No Model.) 2 Sheets—Sheet 2.
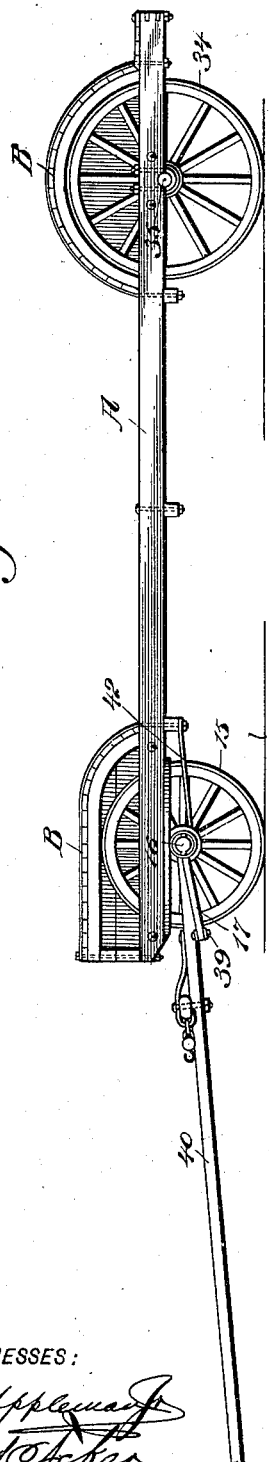
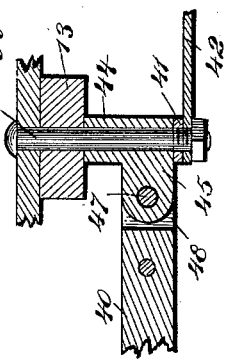
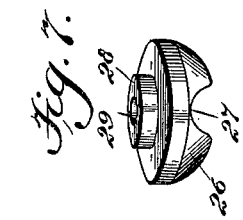
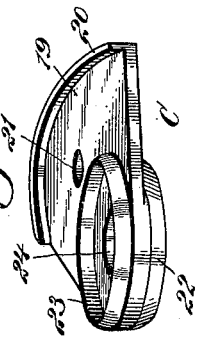
WITNESSES:
INVENTOR
Timothy B. Benedict
BY
ATTORNEYS

UNITED STATES PATENT OFFICE.

TIMOTHY BUEL BENEDICT, OF LA GRANGE, MICHIGAN.

PLATFORM-WAGON.

SPECIFICATION forming part of Letters Patent No. 668,434, dated February 19, 1901.

Application filed November 1, 1900. Serial No. 35,098. (No model.)

*To all whom it may concern:*

Be it known that I, TIMOTHY BUEL BENEDICT, a citizen of the United States, and a resident of La Grange, in the county of Cass and State of Michigan, have invented a new and useful Improvement in Platform-Wagons, of which the following is a full, clear, and exact description.

The purpose of the invention is to so construct a platform farm-wagon that it will be much lower than ordinary platform-wagons of the same height of wheels, enabling a load to be conveniently and quickly placed upon the platform or removed therefrom, and to provide a vehicle of the character referred to which will be light, yet strong, and in the construction of which the ordinary axles, bolster-blocks, bolster-hounds, reach, and sway-bar will be dispensed with.

A further object of the invention is to so construct the vehicle that the weight is equally distributed at the corners and is equally supported at the wheels, which are beneath the corner portions of the platform.

Another purpose is to provide each wheel with a separate axle and to provide a coupling between the front axles and the tongue or pole which will permit the vehicle to be turned short with safety and which will also allow the pole or tongue to freely move from side to side or up and down.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a bottom plan view of the improved vehicle. Fig. 2 is a side elevation thereof. Fig. 3 is a vertical section through a portion of the platform and the bearing for one end of a forward axle. Fig. 4 is a detail view of a coupling between the pole or tongue and the platform of the vehicle. Fig. 5 is a section through the said coupling and platform of the vehicle and likewise a section through a portion of the pole or tongue, and Figs. 6 and 7 are perspective views of parts of the bearing shown in Fig. 3.

A represents the platform of the platform-wagon, and this platform may be made as light as possible consistent with strength. At the front and rear of each corner of the platform the usual bow B is formed, as is shown in Figs. 1 and 2. Just beneath the forward bows B, at the outer sides of said bows, curved tracks 10 are attached, preferably to blocks 11, secured within the forward bows, as shown in Fig. 1. That portion of the platform between the forward bows is provided with side longitudinal sills 12, an intermediate cross-sill 13, and a front sill 14, which extends along the front portions of the said forward bows. The forward wheels 15 are each secured to an axle 16. These axles have no connection one with the other, and each axle is passed through suitable openings in the members of a forwardly-extending U-frame 17, as is best shown in Fig. 1, and at the outer end of each axle 15 a friction-wheel 18 is secured to the axle. These friction-wheels 18 travel on the tracks 10.

The inner end of each forward axle 16 is supported in a bearing C, which bearing is shown in detail in Figs. 3, 6, and 7. The body portion of each bearing consists of a segmental plate 19, connected with a circular section 22, having a depression 23 in its top and bottom faces and a central opening 24, as is best shown in Fig. 6. The segmental plate 19 is provided with a marginal flange 20 and with an opening 21, through which a bolt or equivalent device is passed into one of the beams 12. A cap 26 is fitted in the under face of the circular section 22 of the bearing, and this cap is provided with a boss 28, which is adapted to enter the opening 24, and an opening 29 is made in the central portion of the cap, extending through from one face to the other, and in the bottom face of the cap 26 a cavity 27 is produced, preferably semicircular. When a bearing has been secured to a beam 12, as shown in Fig. 3, a sleeve 25 is passed through the beam and into the cap 26 of the bearing, and a bolt 30 is then loosely passed through the said sleeve and beyond the outer face of the sill 12, as shown in Fig. 3, and this bolt terminates at its lower end in an eye 31, in which eye the inner end of an axle 16 is passed, so that the axle may turn in the said eye, and the wheel on the axle may be moved in any direction necessary to make a turn. The inner ends of the axles 16 rest upon the flanges 20 of the bearings and prevent the wheels 15 from dropping should the vehicle be stood upright or placed upon its side—under cover, for example. The bolts 30 pass through washers 32, engaging with the beams 12, and suitable nuts 33 are located at the upper ends of the bolts 30, which ends only are threaded.

As the forward wheels are beneath the forward bows B, the rear wheels are beneath the rear bows, and these rear wheels 34 preferably turn loosely on their axles 35 and in contact with bearing-surfaces 36, which may be ball-bearings, if desired. The rear axles 35 are preferably fixed to the outer side walls 37 and the inner side walls 38 of the rear bows, as is best shown in Fig. 1.

A link 39 is pivotally connected with the inner forward corner portions of the U-frame 17, as is shown in Fig. 1, and this link 39 at its center is pivotally attached to the pole or tongue 40. The rear end of the pole or tongue 40 is provided with jaws 48, and these jaws extend between an arched strap 41 and the intermediate sill 13, to which the strap is secured, the arched strap being preferably strengthened by a longitudinal strap 42. (Shown in Figs. 1 and 5.)

A pin 43 is passed down through the platform A and through the intermediate sill 13 and likewise through the central portion of the arched strap 41 and the forward end of the brace-strap 42, the lower end of the pin being provided with a suitable nut, and this pin is loosely passed through a sleeve 44, which extends from the lower portion of the arched strap 41 to the under face of the intermediate sill 13, as shown in Fig. 5. This sleeve 44 is provided with a horizontal extension 45 at its bottom, in which an opening 46 is made to receive a pin 47, which pin is passed likewise through the rear jaws 48 of the tongue or pole. Thus it will be observed that the tongue or pole may move from side to side and in thus moving will turn the forward wheels 15. It is also evident that the pole or tongue is capable of vertical movement to any desired extent.

Having thus described my invention, I claim as new and desire to secure by Letters Patent—

1. A wagon having its front wheels mounted on independent axles, each of which has one end mounted in a pivoted support, and its other end fitted to travel on a fixed part of the wagon, as described.

2. A wagon having its front wheels mounted on independent axles, each of which has one end mounted in a pivoted support and its other end fitted to travel on a fixed part of the wagon, a pivoted tongue, and a connection between the axles and tongue, as described.

3. A wagon having its front wheels mounted on independent axles, each of which has one end mounted in a pivoted support and its other end fitted to travel on a fixed part of the wagon, yokes through which the axles pass, a pivoted pole, and a connection between the pole and yokes, as described.

4. In platform-wagons, the platform, bows carried thereby, independent axles, one located at each bow, wheels carried by the axles, pivotal supports for the forward axles, a pivoted tongue or pole, yokes through which the forward axles loosely pass, a link connection between the yokes, and a pivotal connection between the link and the tongue or pole.

5. In platform-wagons, the combination, with the platform, bows carried thereby, tracks at the lower outer portions of the forward bows, and pivotal bearings located at the inner side portions of the said forward bows and facing the said tracks, of road-wheels located within the rear bows of the platform, axles carried by the platform upon which the rear road-wheels turn, axles located below the forward bows of the platform, each forward axle being in engagement with one of the said pivotal bearings, friction-wheels at the outer ends of the forward axles and engaging with the said tracks, and forward road-wheels carried by the forward axles, as and for the purpose set forth.

6. In platform-wagons, the combination, with the platform, bows carried thereby, tracks at the lower outer portions of the forward bows, and pivotal bearings located at the inner side portions of the said forward bows and facing the said tracks, of road-wheels located within the rear bows of the platform, axles carried by the platform and upon which the rear road-wheels turn, axles located below the forward bows of the platform, each forward axle being in engagement with one of the said pivotal bearings, friction-wheels at the outer ends of the forward axles and engaging with the said tracks, forward road-wheels carried by the forward axles, forwardly-extending yokes loosely mounted on the forward axles, a link connecting the forward inner corner portions of said yokes, a pivoted tongue or pole, and a pivotal connection between the said link and the tongue or pole.

7. In platform-wagons, a platform and bows for the same located at the corner portions of the platform, bearings located at the inner side portions of the forward bows, which bearings consist of a body secured to the platform, caps turning in the said body portions of the bearings and bolts passed through the two sections of the bearings, the said bolts terminating in eyes at their lower ends, each body portion of a bearing having an inwardly-extending section which is attached to the platform and is provided with a segmental flange, segmental tracks secured at the outer side portions of the forward bows, forward axles having their inner ends passed through the eyes of the said bearings, friction-wheels on the outer ends of said forward axles, engaging with the said tracks, road-wheels loosely mounted on the forward axles, a pivoted tongue pivotally connected with the forward axles, rear road-wheels within the rear bows, and axles for the rear road-wheels secured to the said platform, as described.

8. In platform-wagons, a pair of forward axles, one axle independent of the other, each axle having a guide at its outer end, a track for the said guides, pivotal bearings located on the platform, receiving the inner ends of said forward axles, a pivoted tongue, and a connection between said tongue and the forward axles, for the purpose described.

9. In platform-wagons, the combination, with the platform and supporting-straps extending down therefrom, of an angled sleeve located between the platform and the supporting-straps, a pivoted bolt passing through the vertical member of the said sleeve, and a pole or tongue pivotally connected with the extension or forward member of the said sleeve, for the purpose described.

10. In a wagon, the combination with a platform provided with a track on its under face, of an axle having on its outer end a friction-wheel traveling on the track, a supporting-wheel secured to the axle, and a pivoted bearing in which the inner end of the said axle is mounted, substantially as described.

11. In a wagon the combination with a platform having tracks on their under faces, of axles having on their outer ends friction-wheels traveling on the tracks, supporting-wheels secured to the axles, yokes through which the axles loosely pass, a link connecting the yokes, and a pivoted tongue to which the link is pivoted, substantially as described.

In testimony whereof I have signed my name to this specification in the presence of two subscribing witnesses.

TIMOTHY BUEL BENEDICT.

Witnesses:
ISAAC H. WELLS,
IRA Y. CROSS.